United States Patent [19]

Mosehauer

[11] 4,287,285
[45] Sep. 1, 1981

[54] METHOD AND APPARATUS FOR FABRICATING PERSONAL IDENTIFICATION DOCUMENTS

[75] Inventor: Michael W. Mosehauer, Spencerport, N.Y.

[73] Assignee: Eastman Kodak Company, Rochester, N.Y.

[21] Appl. No.: 104,473

[22] Filed: Dec. 17, 1979

Related U.S. Application Data

[63] Continuation of Ser. No. 952,423, Oct. 18, 1978, abandoned.

[51] Int. Cl.³ .................. G03G 13/16; G03G 13/22
[52] U.S. Cl. .................................. 430/124; 156/277; 156/300; 428/204; 428/916; 40/2.2; 283/7; 430/126
[58] Field of Search .................. 430/126, 124; 40/2.2; 283/7; 156/277, 300; 428/204, 916; 118/659, 660, 661, 662

[56] References Cited

U.S. PATENT DOCUMENTS

| | | | |
|---|---|---|---|
| 3,549,447 | 12/1970 | Bresnick | 430/126 |
| 3,698,314 | 10/1972 | Grier | 430/126 |
| 3,788,995 | 1/1974 | Stahly et al. | 430/115 X |
| 4,006,050 | 2/1977 | Hurst et al. | 40/2.2 X |
| 4,097,279 | 6/1978 | Whitehead | 283/7 X |

FOREIGN PATENT DOCUMENTS

| | | | |
|---|---|---|---|
| 6802720 | 8/1968 | Netherlands | 430/126 |
| 1179198 | 1/1970 | United Kingdom . | |
| 1413832 | 11/1975 | United Kingdom . | |

Primary Examiner—Roland E. Martin, Jr.
Attorney, Agent, or Firm—John D. Husser

[57] ABSTRACT

Personal identification documents are fabricated by liquid developing an electrostatic image on a photoconductive insulating member to form a high resolution toner image which includes a visually verifiable feature of the authorized document holder and thermally transferring such image from the photoconductor to a core substrate having general authenticating data or to a cover sheet which is subsequently laminated to such a core substrate.

3 Claims, 4 Drawing Figures

METHOD AND APPARATUS FOR FABRICATING PERSONAL IDENTIFICATION DOCUMENTS

CROSS REFERENCE TO RELATED APPLICATIONS

This is a continuation-in-part of my U.S. Application Ser. No. 952,423 entitled IMPROVED METHOD FOR FABRICATING PERSONAL IDENTIFICATION DOCUMENTS and filed Oct. 18, 1978, now abandoned.

BACKGROUND OF THE INVENTION

1. Field of Invention

The present invention relates to improvements in the manufacture of substantially tamper-proof personal identification documents, and more particularly to improved methods and apparatus for electrophotographically personalizing identification documents.

2. Description of Prior Art

There has long existed a need for documents which authenticate that a particular person is authorized for certain privileges, financial credits, passes, etc. To effect the desired purpose, that is assuring that only the authorized person engages in the document-authorized activities, the document should accomplish at least two things. First, it should be substantially non-counterfeitable. Second, it should be readily identifiable by a monitoring agency as connected uniquely with the authorized document holder, and substantially tamper-proof with respect to alteration of this unique connective feature. In most instances it is desirable that the document be of high quality, e.g., attractive, yet producible at a reasonable cost.

There have been many approaches for achieving these objectives, increasing in complexity as new technologies evolved. One more recent approach which shows particular promise is to embed within the document detectable materials (e.g., a magnetic material) forming a code pattern which is extremely difficult to duplicate. This approach and others can accomplish the objective of substantial non-counterfeitability with respect to a number of similar documents. That is, they can be mass-produced in a central location, thus making per document costs feasible. There remains the need to "tailor" each such document to the specific person that is authorized to use it in a manner which is economical but achieves the high quality and tamper-proof aspects mentioned above.

Photographs and signatures of the authorized individual, affixed to the document have heretofore been the most common means for accomplishing this purpose. However, signatures are fairly easily forged, and most prior art techniques for affixing photographs to the non-counterfeitable core portion of documents have not satisfactorily deterred the substitution of another individual's photograph.

It has been contemplated that electrophotography may be useful as a technique for personalization of identification documents. For example British Pat. No. 1,413,832 discloses a procedure wherein an electrostatic image of a personal feature is formed on a photoconductor, transferred to the identification document and developed on that document. This technique requires image development on the identification document itself which is difficult to accomplish with good quality because of the relatively high thickness and/or internal non-uniformities of core substrates. U.S. Pat. No. 4,006,050 discloses an alternative electrophotographic technique in which an electrostatic image of the personal feature is formed on the photoconductor and developed with toner in a conventional manner, the toner image then being electrostatically transferred to a special heat sensitive release layer of an intermediate sheet and finally heat transferred onto the identification card substrate. This technique avoids the difficulties involved with developing an electrostatic image on the identification document but requires transfer of that image onto a special intermediate sheet.

SUMMARY OF THE INVENTION

It is an object of the present invention to provide improved methods and apparatus for electrophotographically personalizing identification documents.

More specifically, it is an object of the present invention to provide such improved methods and apparatus which avoid development on the identification document but do not require any special intermediate transfer members, thus simplifying the production of high quality identification documents.

Such objectives and advantages are accomplished according to the present invention by forming an electrostatic image of the personalizing feature on a photoconductor, liquid developing the electrostatic image and thermally transferring the toner image, formed by such liquid development, directly from the photoconductor to the core substrate of the identification document.

BRIEF DESCRIPTION OF THE DRAWINGS

In the subsequent detailed description of exemplary embodiments of the invention reference is made to the attached drawings which form a part hereof and in which:

Referring to FIG. 1, the present invention will be described with reference to the embodiment there illustrated. It will be appreciated that the present invention can be implemented by other apparatus embodiments and, in certain modes, manual steps can be substituted for certain of the illustrated mechanisms.

Figure 1:
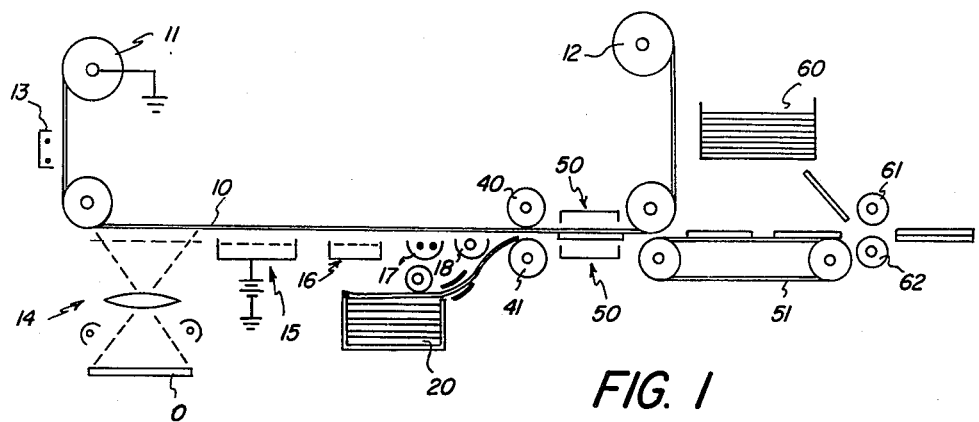
FIG. 1 is a schematic side view of apparatus illustrating one mode and configuration for implementing the present invention.
Figure 2:
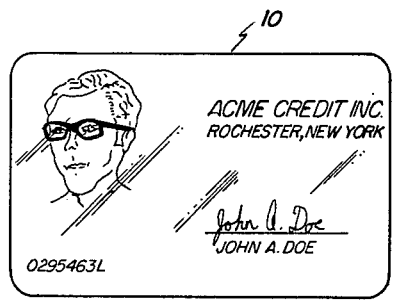
FIG. 2 is an enlarged view of a photoconductor segment of the FIG. 1 apparatus having a toner image developed thereon.
Figure 3:
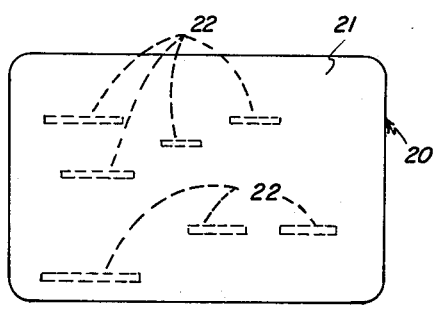
FIG. 3 is a plan view of one embodiment of a core substrate useful in accordance with the present invention.

In the FIG. 1 embodiment, an electrophotographic imaging member 10 is fed along an operative path from a supply spool 11 to a take-up spool 12. Typically the imaging member comprises a photoconductive insulating layer overlying a thin conductive layer on a support. Along the operative path are disposed a corona charging station 13, an exposing station 14 and a development station 15, e.g., such as disclosed in U.S. Pat. No. 3,407,786. The conductive layer of member 10 can be coupled to ground, e.g., at spool 11 by various means known in the art. The structure thus far described places a uniform primary electrostatic charge on the photoconductor at station 13, forms a latent electrostatic image by light exposing the photoconductor to an original 0 at station 14 and liquid develops the resulting electrostatic image on the photoconductor at station 15. Member 10 then will bear a toner image such as shown in FIG. 2 or a reverse image of the original, depending on whether exposure is from the front or rear of image member 10.

After liquid development, the image member is subjected to a rinse at station 16, e.g., with clear Isopar G carrier liquid, and corona squeegeed at station 17. Next the toner image desirably is dried, e.g., with warm air, at station 19, and it is then ready for thermal transfer to an identification document core substrate from a supply 20. Such substrates can comprise a matrix 21, formed of suitable plastic material such as polyvinyl chloride or Estar ® film base with magnetic particles 22 embedded therein in a predetermined code pattern. It is to be noted that the particular core substrate shown is merely exemplary and that the present invention can utilize many other types of core substrates. Usually the core substrate will be durable and contain some general document authenticating indicia. The core substrate can be a multilayer structure and the indicia can be selected for various types of physical or chemical verification. For example, the indicia can be optically or electronically detectable instead of magnetically.

The supply of substrates 20 is disposed in a spaced relation to the image member 10 and substrates are fed one at a time into transfer relation with respective toner images on member 10 at the nip of thermal transfer rollers 40, 41.

Figure 4:
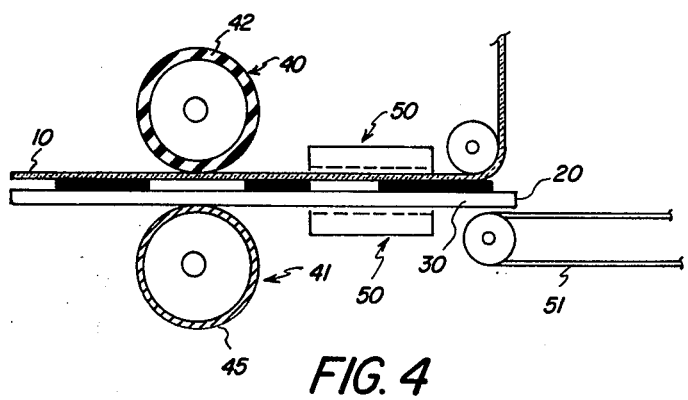
FIG. 4 is an enlargement of a portion of the FIG. 1 view illustrating in more detail one means and method for effecting thermal transfer in accordance with the present invention.

FIG. 4 shows one preferred configuration and mode of the concept I have found to be particularly effective and useful in forming personal identification documents. This approach involves thermally transferring the toner rather than electrostatically transferring it and can be effected utilizing a heating roller 40 and a cooling roller 41. The heating roller 40 can have a silicone rubber peripheral coating denoted 42 and can be internally heated by conventional means (not shown). The cooling roller can be solid metal and have a thin Teflon coating 45. The rollers 40 and 41 desirably are urged together to provide a nip pressure, e.g., in the range from about 1 to about 100 lbs/linear inch. The heated roller surface temperature will depend on toner and cover sheet material utilized and the roller speeds; however, in general, roller temperatures can be in the range of from about 40° C. to about 300° C. or greater.

In operation, the photoconductor, bearing the liquid developed image, and a core substrate 20 are placed in registry with the toner image therebetween and fed together into the nip of the rollers 40 and 41 so that the back side of the photoconductor is contacting the heated roller 40. The outer surface of the core substrate 20 thus contacts the cooling roller 41.

After passing through the rollers, the sandwich of photoconductor and core substrate is cooled to a temperature at or near room temperature, e.g., below approximately 100° F., by cooling means 50 which can be cool air baffles as illustrated schematically in FIGS. 1 and 4. Thereafter the photoconductor is removed, leaving the thermally attached toner image on the core substrate, e.g., by feeding the image member 10 up toward take-up spool 12 while retaining core substrate on vacuum transport belt 51.

After separation from the photoconductor, the core substrate 20, having the toner image attached, is in condition for lamination with a cover sheet, if desired. This can be accomplished by feeding the toner bearing surface of core substrate 20 into registry with a cover sheet from supply stack 60 and feeding this composite unit between rollers 61 and 62 (which can be constructed in the same manner as transfer rollers 40, 41) with cover sheet contacting heated roller 61. It will be appreciated that the sequence described can be modified so that toner is first transferred to a cover sheet which is then laminated to the core substrate with the toner sandwiched therebetween. In this regard either the cover sheet or core substrate can be thought of as a transfer element for the photoconductor.

With the above description of one representative configuration and mode of the present invention now in mind, some more generalized descriptions of certain of its aspects are appropriate. Thus, it is an important feature of the present invention that liquid development and thermal transfer, in combination, overcome previous difficulties and provide advantageous results in the production of identification documents.

Besides being desirable for developing continuous tone images, the small size toner particles of liquid developers have the characteristic that pigment-binder components thereof form extremely thin films on the photoconductor imaging member. It appears that this latter characteristic facilitates the thermal transfer of a high percentage of the toner image to thick core substrates of the type useful in identification documents. Transfer to such substrates by other conventional techniques (e.g., corona transfer) has been extremely difficult to accomplish with adequate completeness.

Suitable liquid developer compositions thus should comprise an electrophoretic mixture of very small toner particles, e.g., from about $0.1\mu$ to $1.0\mu$, and binder in an insulating carrier liquid. The toner particles preferredly should be more cohesive to the transfer sheet than to the photoconductor and the carrier liquid should be a non-solvent for the photoconductor surface and volatile enough to dissipate readily before transfer.

Liquid developers of the general type described in U.S. Pat. Nos. 3,788,995; 4,052,325 and 4,145,299 are illustrative of the type useful in practice of the present invention, although all features of the developers described in those patents are not necessarily required. One particularly preferred class of developers for practice of the present invention is described in U.S. Application Ser. No. 906,174 filed May 15, 1978 in the name of Merrill et al.

The following Example of one, more specific, preferred procedure will further illustrate practice of the present invention:

A photoconductive film of the above-described type was charged to $(-)500$ volts with a controlled grid corona charger and exposed to an original using two flashes at a lens opening of f4.5. The flash exposure energy at the film plane without any filters was 1900 ergs/cm$^2$. This reduced the voltage of the "white" areas of the electrostatic charge image to $(-)150$ volts. In the picture area, a 133 line negative, square dot magenta contact screen was placed into close contact with the film. A 0.5 neutral density filter (Wratten No. 96) was used over the rest of the image area to balance the exposure. The latent image was developed using liquid developer of the kind described above for about four seconds with a fine slotted development head, such as disclosed in U.S. Pat. No. 3,407,786, spaced 25 mils from the film surface. After development, the film was rinsed in clear Isopar G liquid, squeegeed with a positive corona charger and then dried in warm air. The toner image was transferred from the film to the plastic I.D. card stock with a set of heated transfer rollers, the top roller being heated internally with a resistance heater to a temperature measured as 300° F. The core of the heated roller was aluminum and the outer surface was coated with a silicone rubber. The bottom roller also had an aluminum core but was coated with Teflon, and not heated. Both rollers were about two inches in diameter, and transfer speed was about one ft/min. The support side of the photoconductor film was in contact with the top, heated roller and the plastic card stock was in contact with the Teflon-coated roller. After transfer, the film and the plastic card stock were cooled to about 100° F. before separation. In comparing the amount of toner transferred by this procedure to electrostatic transfer procedures, it was remarkable to find that from about 85 to 90% of the toner was transferred using the thermal transfer technique compared to about 30% toner transferred using electrostatic procedures. This increase in transferred toner increased significantly the optical density of the final image in the identification document.

The invention has been described in detail with particular reference to certain preferred embodiments thereof, but it will be understood that variations and modifications can be effected within the spirit and scope of the invention.

What is claimed is:

1. A method of personalizing a core substrate of the type containing general authenticating information, said method comprising the steps of:
   (a) electrophotographically forming an electrostatic image of a visually identifiable personal feature on a photoconductive surface of an imaging member;
   (b) liquid developing said electrostatic image with toner particles in the size range from about 0.1 micron to about 1.0 micron; and
   (c) thermally transferring said developed toner image directly from said photoconductive surface to such a core substrate, said transferring step comprises passing the imaging member and such core substrate between the nip of a pair of transfer rollers with the toner image contacting the transfer member, the roller contacting said photoconductor being heated to a temperature greater than about 40° C. and the roller contacting said core substrate being unheated.

2. The invention defined in claim 1 wherein said rollers are urged toward each other to provide nip pressure therebetween.

3. The invention defined in claim 1 further including the steps of separating the core substrate from said imaging member and laminating a transparent cover sheet over the toner image on said core substrate.

* * * * *